United States Patent Office 2,936,331
Patented May 10, 1960

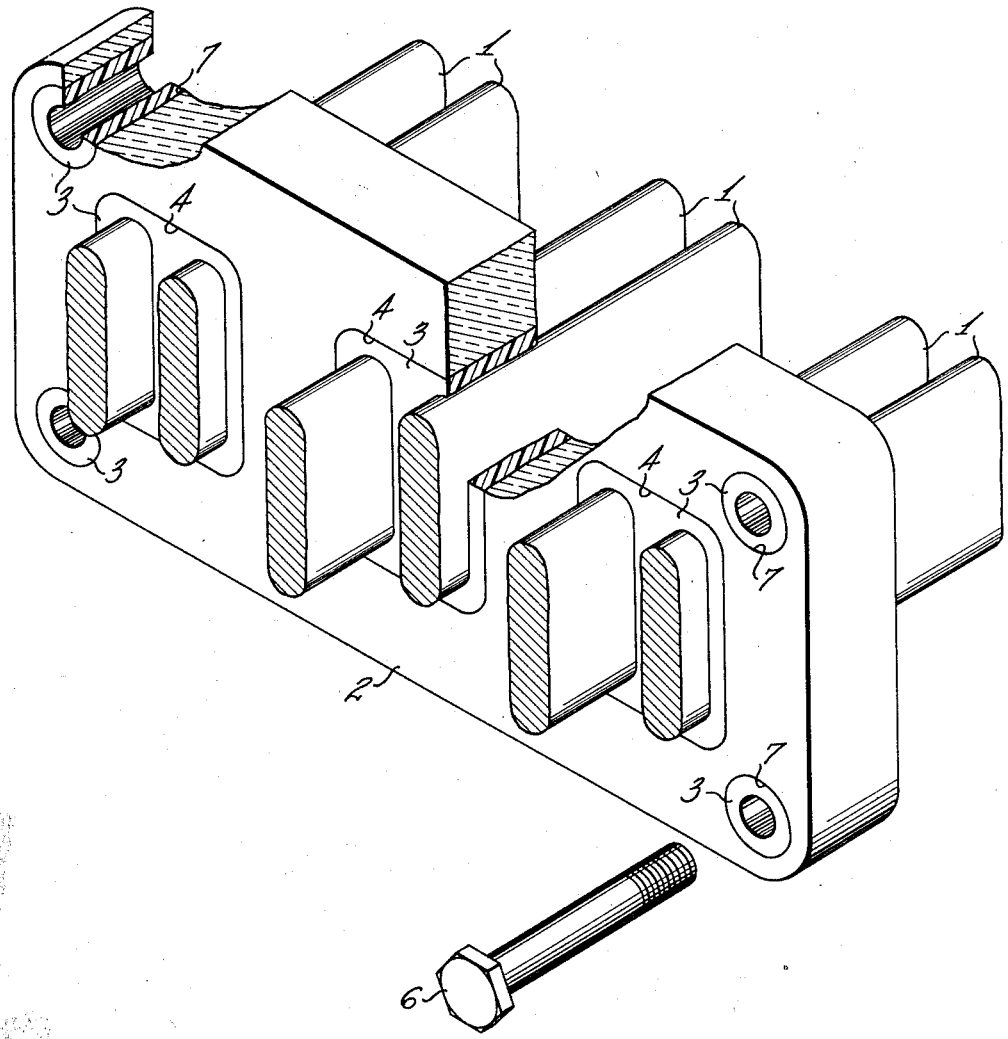

2,936,331

CONDUCTOR SUPPORT EMPLOYING RESIN

Thomas G. A. Sillers, Wauwatosa, Wis., assignor to Allis-Chalmers Manufacturing Company, Milwaukee, Wis.

Application February 4, 1957, Serial No. 638,143

2 Claims. (Cl. 174—209)

This invention relates to electric conductor supports and more particularly to means for insulating and resiliently supporting a bus bar or a plurality of bus bars.

In modern electric equipment such as high voltage metal clad switchgear units, conductors such as heavy duty bus bars carry current at high voltages. These high voltages necessitate the use of new and improved bus bar supports.

Porcelain is an effective material for supporting high tension electric conductors because of its physical strength, fireproof construction, insulating qualities and resistance to carbon tracking. However, the use of a ceramic, more particularly a porcelain, support for electrical conductors entails problems. These problems include the difficulty and expense of forming ceramic supports to close dimensional tolerances required for a close fit around the bus bar, possible cracking of the ceramic support due to vibration, and possible corona discharge caused by ionization in the air gaps between the conductor and the ceramic support.

Prior attempts to solve these problems have involved the use of a layer of filler material between the ceramic support and the conductor to be supported. But the filler materials used, such as rubber, Portland cement, sulphur cement, fused lead borate and metal alloys, fail to satisfactorily solve the above mentioned problems. The use of rubber as a filler may result in a mounting which is too loose. A cement filler, whether of Portland or sulphur cement, may expand or contract enough to cause cracks or air gaps, and lacks the necessary resiliency. Fused lead borate is unsatisfactory as a filler material because it lacks the necessary resiliency and is therefore subject to cracking. Metal alloys are undesirable because they are not insulating in character and introduce a capacitance problem.

It has been found that the use of a layer of resin as a filler material between the inner surface of the ceramic support and the outer surface of the conductor satisfactorily solves the problems involved, including those outlined above.

Therefore, in accordance with one aspect of the present invention, a new and improved means for supporting bus bars is provided which may employ a ceramic support with apertures to be filled with flexible resin in which conductor openings can be accurately located, means for mounting the support, a conductor projecting through each aperture, and a layer of cast flexible resin completely filling the space between the bus bar and the inner periphery of the aperture. Thus new and improved structure for mounting an electric conductor is provided in which a layer of insulating resin fills in the area between the conductor and the aperture through which the conductor extends.

It is therefore one object of the present invention to provide a new and improved application of cast ceramics and resin to electric conductor supports and to means of mounting the same.

Another object of this invention is to provide a new and improved bus bar support which insulates and resiliently supports the bus bar at the point of support and which is highly resistant to arcing and flashovers.

A further object of this invention is to provide a new and improved structure in which a ceramic support having an inner layer of flexible cast resin embraces and thereby resiliently supports one or more bus bars substantially without looseness or air voids.

Other objects and advantages of the invention will be apparent from the following description when read in connection with the accompanying drawing, in which:

The figure is an isometric view of a single support with parts broken away, showing a plurality of conductors in place and illustrating the present invention.

Referring more particularly to the figure, a conductor support structure embodying the new and improved mounting means is illustrated. A plurality of electric conductors in the form of flat bus bars 1 are shown extending through a substantially rectangular support 2. In the embodiment shown, the support holds six bars, two bus bars extending through each of three apertures. However, the invention is not limited to any particular number or arrangement of supports, apertures therein, or conductors.

The resin 3 is molded in or otherwise formed, when either in the fluid or the pliable state, between each of the conductors or bus bars 1 and the inner periphery of each aperture 4 in the support 2. The support 2 may be formed of any suitable ceramic material, a wet process porcelain being preferred, and the dimensions of the apertures are purposely made slightly larger than those of the conductors, thus eliminating the need for casting the procelain support to close tolerances.

The resin 3 is a thermosetting or thermostable type so that it can be molded when in the fluid state or otherwise formed when pliable and allowed to cure or harden without further treatment. In the cured state the resin 3 is slightly resilient and preferably flame retardant. Bus apertures 4 may be accurately molded into ceramic and buses inserted later or buses may be accurately located in position before resin is cast. A resin with particularly good qualities of strength and resilience is "CRP-241," an epoxy resin made by the Minnesota Mining and Manufacturing Company. However, other available resins with the qualities specified may serve equally as well, and the present invention is not limited to any particular manufacturer's resin.

The word resin as used in the specification and claims includes natural and synthetic resins, but refers primarily to synthetic resins made from synthetic materials, as by the condensation or polymerization of combinations of phenol, formaldehyde, urea, polyamides, vinyl derivatives, epoxies, etc. Thermosetting or thermostable types of resin that are flame retardant and slightly resilient in the cured state should be employed.

The size of the apertures 4 will vary with the size, number and desired spacing of the conductors or bus bars to be supported. The apertures shown in the figure are for purposes of illustration only, and their inner dimensions need be only slightly larger than the outer dimensions of the conductor or conductors to be supported.

As is well known in the art, the bus bars 1 may be covered or partially covered with insulating material of a suitable character such as insulating tape, or inserted in closely fitting phenolic insulating tubes. These phenolic tubes may be provided with an inner conductive coating to eliminate stress concentrations.

The ceramic support is a fireproof insulator and is highly resistant to cracks which often cause flashovers and burnouts in other types of insulation. The resin is also an insulating medium, and is preferably fireproof or fire resistant.

Any suitable means for mounting the ceramic support 2 may be used, including bolt means and groove means among others, and a layer of flexible cast resin may be employed for so mounting. In the figure, bolt receiving apertures 7 are shown formed in the corners of the support plate, and made slightly larger than required for mounting bolts 6. The space between the bolt and the inner periphery of each aperture is filled in with resin 3, thus eliminating the necessity of casting these holes to close tolerances. A firm but resilient mounting capable of withstanding mechanical shock and pressure without breaking and also capable of accurate location and parallel relationship to one another is thus formed. The surface of the poreclain support may be slightly warped, or the surface on which the porcelain supports are mounted may be slightly uneven. Therefore by filling these mounting holes in with resin these conditions may be corrected and an accurate mounting may be obtained, free from strains and danger of cracking.

Dummy conductors may be used during the casting of resin and later removed. This will leave apertures only large enough to receive and support conductors firmly. Again, any suitable means for mounting the support in a component such as a switchgear unit may be used. If bolt means are to be utilized, the same method of casting in and later removing dummies, in this case dummy bolts, may be employed.

Although but a single embodiment of the present invention has been illustrated and described, it will be apparent to those skilled in the art that various changes and modifications may be made therein without departing from the spirit of the invention or from the scope of the appended claims.

What is claimed is:
1. The combination comprising a ceramic support defining an aperture extending therethrough, said aperture being formed by a surface extending completely therearound, an electric conductor extending through said aperture and spaced from said surface, a thermostable resilient resin lining bonded to said surface and engaging with said conductor along its full periphery to support said conductor in inwardly spaced relation from said surface, and means for mounting said support.

2. The combination comprising a porcelain support defining an aperture extending therethrough, said aperture being formed by a surface extending completely therearound, at least one electric conductor extending through said aperture and spaced from said surface, a flexible and fireproof thermosetting resin lining bonded to said surface and engaging with said conductor along its full periphery to support said conductor in inwardly spaced relation from said surface, a plurality of mounting apertures, a layer of flexible and fireproof thermosetting resin bonded to each of said mounting apertures and defining an aperture adapted to receive a mounting bolt.

References Cited in the file of this patent
UNITED STATES PATENTS

| | | |
|---|---|---|
| 2,148,201 | Houwink | Feb. 21, 1939 |
| 2,532,845 | Jensen | Dec. 5, 1950 |
| 2,749,385 | Adam | June 5, 1956 |
| 2,868,864 | Page | Jan. 13, 1959 |

FOREIGN PATENTS

| | | |
|---|---|---|
| 6,628 | Great Britain | 1889 |
| 111,318 | Germany | June 9, 1900 |